(12) United States Patent
Becker

(10) Patent No.: US 8,456,310 B2
(45) Date of Patent: Jun. 4, 2013

(54) METHOD OF AND APPARATUS FOR REPELLING AQUATIC CREATURES

(76) Inventor: Carl Marthinus Becker, Westville (ZA)

( * ) Notice: Subject to any disclaimer, the term of this patent is extended or adjusted under 35 U.S.C. 154(b) by 693 days.

(21) Appl. No.: 12/514,399

(22) PCT Filed: Oct. 11, 2007

(86) PCT No.: PCT/ZA2007/000070
§ 371 (c)(1),
(2), (4) Date: Nov. 27, 2009

(87) PCT Pub. No.: WO2008/046116
PCT Pub. Date: Apr. 17, 2008

(65) Prior Publication Data
US 2011/0290190 A1      Dec. 1, 2011

(30) Foreign Application Priority Data
Oct. 11, 2006    (ZA) .................................. 2006/08462

(51) Int. Cl.
*G08B 23/00* (2006.01)
*A01K 61/00* (2006.01)

(52) U.S. Cl.
USPC ...................................... 340/573.2; 119/220

(58) Field of Classification Search
USPC .............................. 340/573.1, 573.2; 119/220
See application file for complete search history.

(56) References Cited

U.S. PATENT DOCUMENTS

| | | | |
|---|---|---|---|
| 3,164,772 A | | 1/1962 | Hicks IV |
| 3,683,280 A | | 8/1972 | Holt |
| 3,822,403 A | | 7/1974 | Coleman et al. |
| 4,211,908 A | | 7/1980 | Niwa |
| 4,667,431 A | | 5/1987 | Mendicino |
| 5,566,643 A | | 10/1996 | Charter et al. |
| 7,238,075 B2 * | | 7/2007 | Brodsky .......................... 441/80 |
| 7,302,905 B1 * | | 12/2007 | Wynne ........................... 114/343 |
| 2003/0051674 A1 * | | 3/2003 | Leblanc ........................ 119/220 |

* cited by examiner

*Primary Examiner* — Monica Williams
(74) *Attorney, Agent, or Firm* — Grossman Tucker Perreault & Pfleger PLLC

(57) ABSTRACT

This invention relates to a method of and apparatus for repelling aquatic creatures and finds particular application in the protection of surfers (or surfboards) and personal watercraft such as surf skis, paddle skis and the like from shark attack. The drawing illustrates the device 10 installed on the underside of a surfboard 100, the device 10 consisting of a pair of housings 102, 104 connected to one another by a cable tray 106. One of the housings 102, 104 houses the device circuitry and the other of the housings 102, 104 houses a rechargeable power source. The device circuitry comprises electrodes connected in a circuit and adapted for immersion in a body of water, such that the water, in use, completes the circuit.

20 Claims, 3 Drawing Sheets

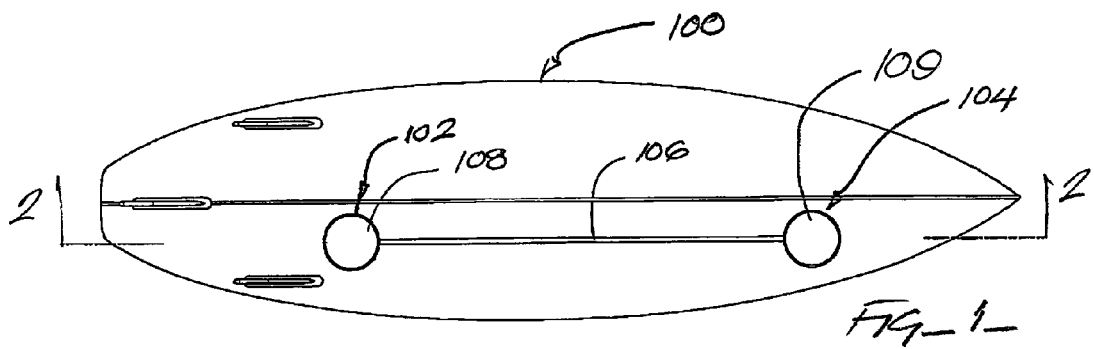
FIG-1-
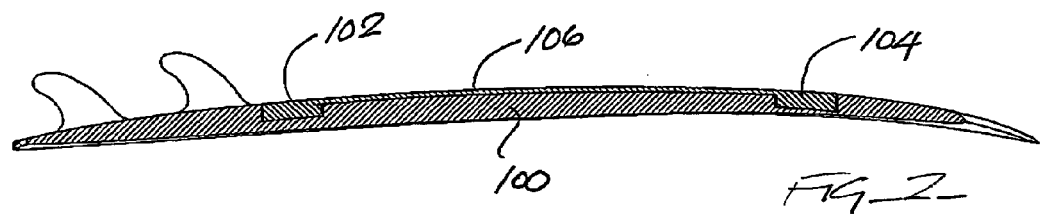
FIG-2-
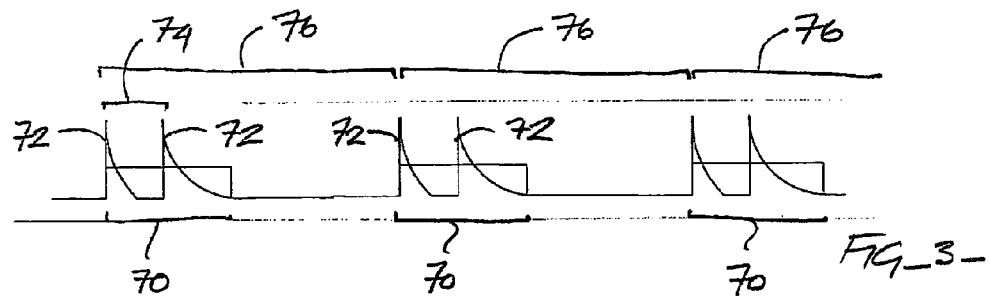
FIG-3-
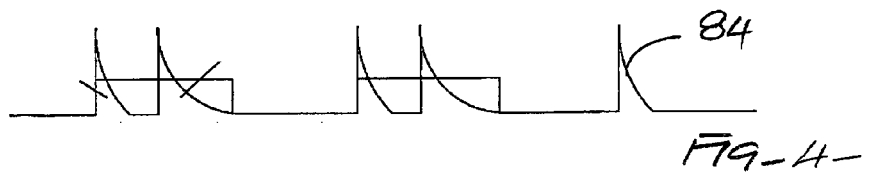
FIG-4-
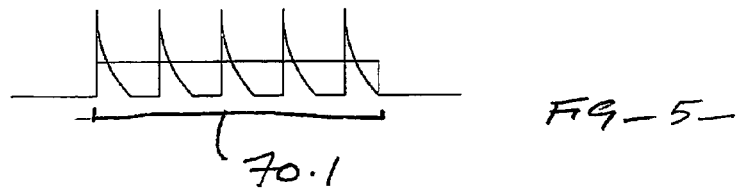
FIG-5-

METHOD OF AND APPARATUS FOR REPELLING AQUATIC CREATURES

BACKGROUND TO THE INVENTION

This invention relates to a method of and apparatus for repelling aquatic creatures such as elasmobranchs and sharks in particular.

The invention finds particular application in the protection of surfers (or surfboards) and personal watercraft such as surf skis, paddle skis and the like from shark attack and it will be described with reference to a surfboard application by way of non-limiting example.

U.S. Pat. Nos. 3,686,280 (Holt) and 3,164,172 (Hicks), describe shark repelling devices utilising pulse generators producing an electric field to divert sharks from the proximity of is the generating apparatus. These early devices are referred to in U.S. Pat. Nos. 3,822,403 (Hicks), 4,667,431 (Mendicino) and 4,211,980 (Stowell).

The patent to Mendicino describes a device similar to a cattle prod or human crowd control tazor, but unlike these devices which are designed for mammals and which operate on high voltages (up to 40,000V) and amperages in the milliamp range, the device described by Mendicino provides a 1-5 Amp, 300V-1000V charge in an attempt to repel sharks.

The patent to Stowell describes a method for repelling sharks by creating, about an electrode submerged in salt water, an electric field with a voltage gradient of sufficient magnitude to "overstimulate" (according to the patent) the nervous system of the shark. He describes a system which applies brief DC pulses to electrodes immersed in salt water with a relatively long delay between pulses (0.5 to 10 ms pulses spaced to a repetition rate of between 6 and 12 Hz).

The patent to Hicks describes the use of current pulses to electrodes to create an electric field between the electrodes at a low frequency of approximately 70 cycles per minute.

U.S. Pat. No. 5,566,643—Charter (Natal Sharks Board) is based on the observation that devices that utilise unidirectional current flows, such as the devices described above, tend to develop a positively charged region about the device cathode. Referring to the research of Dr. Kalmijn and others (Dr. Adrianus J Kalmijn—Woods Hole Oceanographic Institution and the US Office of Naval Research) which tends to show that such a positively charged region serves as an attractant to sharks, the Charter patent describes a device that alternates the current flow between electrodes.

SUMMARY OF THE INVENTION

According to this invention, a device for controlling aquatic animals in a body of water comprises:
  at least one first and one second electrode connected in a circuit and adapted for immersion in a body of water, such that the water, in use, completes the circuit;
  two or more discretely connected electrical charge storage devices;
  a charging circuit for charging the charge storage devices from a source of electrical energy;
  control means for generating control signals; and
  a controllable switch element for each charge storage device acting under the control of the control means;
  the control means being adapted to switch each switch element sequentially to connect the charge storage devices to the electrodes in response to the control signals, to discharge the charge storage devices sequentially;
  to create, with each such discharge, a pulse of electrical current flow in the body of water between the electrodes.

In the device of this invention each charge storage device discharges one electrical pulse and the number of pulses is determined by the number of charge storage devices.

The control means is preferably constituted by a programmable microcontroller programmed to switch the device circuitry to recharge and discharge the charge storage devices repetitively at a predetermined repetition frequency, thereby to create repeating pulses of electrical current flow in the body of water between the electrodes, the pulses having a repetition frequency equal to the charge and discharge repetition frequency predetermined by the microcontroller.

The microcontroller is programmed to switch the device circuitry to recharge and discharge at least some of the charge storage devices in groups with predetermined intervals between each discharge, each group so discharged creating a train of pulses of electrical current flow in the body of water between the electrodes, thereby to create repeating pulse trains of electrical current flow in the body of water, the pulse trains having a repetition frequency equal to the charge and discharge repetition frequency predetermined by the microcontroller.

Each charge storage device discharges one electrical pulse and the number of pulses in a pulse train is determined by the number of charge storage devices in the group of charge storage devices discharged as a group.

In the preferred form of the invention, the device for controlling aquatic animals includes:
  a first set of charge storage devices constituted by one or more charge storage devices that, together, have a predetermined charge storage capacity;
  a second set of charge storage devices constituted by a plurality of charge storage devices, each having the same charge storage capacity as the total charge storage capacity of the first set of charge storage devices;
  a controllable switch element for the first charge storage device set;
  a controllable switch element for the second charge storage device set;
  the control means being adapted to switch the switch element associated with the first charge storage device set to connect the charge storage devices in the first set to the electrodes and, after a predetermined delay, to switch the switch element associated with the second charge storage device set to connect all the charge storage devices in the second set simultaneously to the electrodes, first to discharge the charge storage devices in the first set and, after the predetermined delay, to discharge the charge storage devices in the second set; and
  to create, with the first discharge, a pulse of electrical current flow between the electrodes in the body of water; and
  to create, with the second discharge, a higher energy pulse of electrical current flow between the electrodes in the body of water.

In the device described immediately above, the pulse train is a two-pulse train, but the number of pulses per pulse train can be increased by adapting the control means to switch the switch element associated with the second charge storage device set to connect all the charge storage devices in the second set sequentially to the electrodes, to discharge the charge storage devices in the second set sequentially.

The microcontroller is programmed to charge and discharge the charge storage devices with a pre-programmed periodicity In the device of the invention the pulse amplitude is determined by the charge storage capacity of the charge storage devices, the pulses are separated from one another in pulse trains by a pulse interval determined by the microcontroller programming and the pulse trains are separated from one another by an interval, which interval is repetitive and determined by the microcontroller programming, thereby to determine the pulse train repetition frequency.

The pulse train repetition frequency is preferably adjusted to fall within the known muscular stimulus discomfort range of the target animal and more preferably to maximise the muscle stimulation potential of the pulse train.

The first pulse of each pulse train is preferably followed by a second, higher energy pulse.

The first pulse of each pulse train of the device need not be a high energy pulse. It should simply have enough energy to stimulate the nervous system of the target animal and must be followed rapidly by a second, higher energy pulse The device of this invention is preferably adapted for installation on a personal watercraft, such as a surfboard, a surf ski, paddle ski or the like.

In this form of the invention, the device may conveniently includes a pair of housings adapted for permanent installation in or on the watercraft, the housings being connected to one another by a cable tray adapted for permanent installation in or on the watercraft, the cable tray being adapted to house a wiring harness and electrical connectors, one of the housings being adapted for housing a removable module containing the device circuitry; and the other housing being adapted to house a removable module containing the rechargeable power source.

Each housing is preferably supplied with a cover plate that is adapted to serve as an electrode plate.

In addition, the device may include dummy modules adapted to substitute for the circuitry and power source modules when shark protection is not required.

The invention includes a method of controlling aquatic animals in a body of water comprising:
connecting at least one first and one second electrode in a circuit adapted for immersion in a body of water, such that the water, in use, may complete the circuit;
the circuit including two or more discretely connected electrical charge storage devices, a charging circuit for charging the charge storage devices from a source of electrical energy, control means for generating control signals and a controllable switch element for each charge storage device acting under the control of the control means; and
programming the control means to switch each switch element sequentially to connect the charge storage devices to the electrodes in response to the control signals, to discharge the charge storage devices sequentially and to create, with each such discharge, a pulse of electrical current flow in the body of water between the electrodes.

BRIEF DESCRIPTION OF THE DRAWINGS

The invention will be further described with reference to the accompanying drawings in which:

FIG. 1 is an under plan view of a surfboard with a shark repellant device according to the invention installed in the underside of the board;

FIG. 2 is a sectional side elevation on a line 2-2 in FIG. 1;

FIG. 3 is a waveform diagram of the shark repellant device of the invention;

FIG. 4 is an alternative waveform diagram of the shark repellant device of the invention FIG. 5 is yet a further alternative waveform diagram of the shark repellant device of the invention;

DESCRIPTION OF EMBODIMENTS OF THE INVENTION

Figure 6:
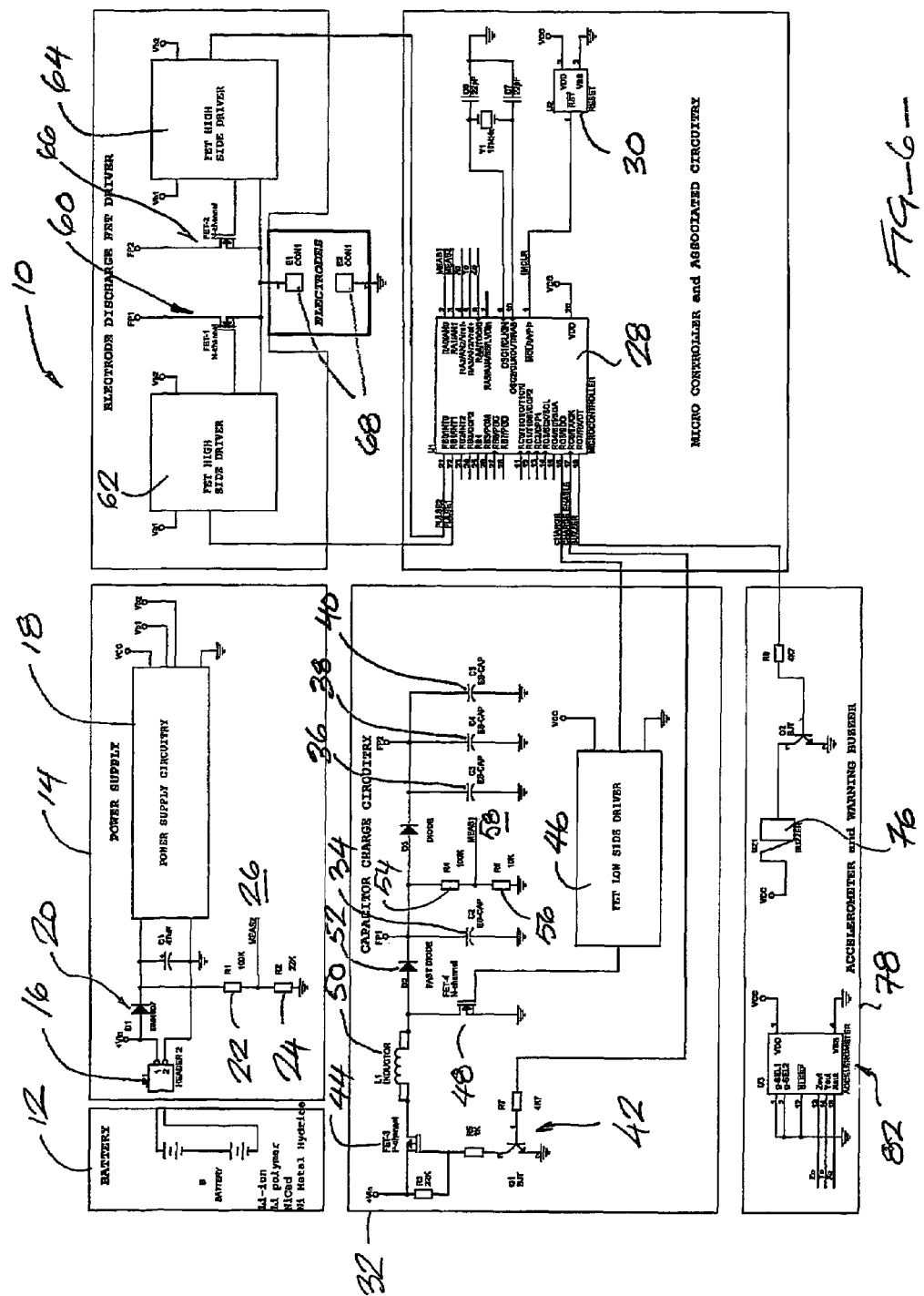
FIG. 6 is a schematic circuit diagram of one embodiment of the shark repellant device of the invention.

The drawings illustrate the installation of the device 10 of FIG. 6 on a surfboard 100 as a means of protecting the user of the surfboard 100 against shark attack.

It will be appreciated that the invention will find greater application than merely the protection of surfers (or surfboards) and personal watercraft and, with modification, can be used in a multiplicity of mobile and fixed installations.

FIGS. 1 and 2 illustrate the device 10 of the invention installed on the underside of a surfboard 100, the device 10 consisting of a pair of housings 102, 104 connected to one another by a cable tray 106. One of the housings 102, 104 is used to house the device circuitry which will be described below and the other of the housings 102, 104 is used to house a rechargeable power source.

Each housing 102, 104 is supplied with a cover plate that doubles as an electrode plate 108, 109.

A wiring harness located within the cable tray 106 connects the battery to the device circuitry.

The battery and circuitry of the device are each constituted by separate, removable waterproof modules that can be inserted and locked into the housings 102, 104 installed in the surfboard 100 and connected in circuit with one another by way of suitable connectors on the modules and the wiring harness. When shark protection is not required, such as when the user is using the device in protected or safe water, the circuitry and battery modules can be substituted with lighter dummy modules that simply close up the housings 102, 104 in the board.

The cable tray 106 and wiring harness are dimensioned to permit the electrode plates 108 109 an electrode spacing sufficient to provide an efficient discharge of electrical energy into the water in use.

FIG. 6 is a schematic circuit diagram or wiring diagram of one example of a shark repellant device 10 according to the invention which is intended for installation in or on a water craft, preferably a personal watercraft such as a surfboard, surf ski, paddle ski, kayak or the like.

The electronic circuitry of the device 10 will be encapsulated in a waterproof housing, one example of which is described above and the device is intended for immersion in the water in which the water craft will be used, thereby to protect the user of the craft from shark attack.

The device circuitry can be categorised into functional blocks, which are described individually below.

Energy Source

The circuitry of the repellant device 10 includes a source of energy such as a battery 12 connecting to power supply circuitry 14 by way of a connector 16. The battery 12 may be a Lithium Ion, Lithium Polymer, Nickel Cadmium or Nickel Metal Hydride cell or cell array with an output voltage of the order of 3 to 24 Volts.

Power Supply

The power supply circuit 14 is constituted, in its simplest form, by a linear voltage regulator or a switch mode power supply 18 fed by the battery voltage. The power supply 18 regulates and generates the voltages required by the rest of the electronic circuitry to operate and function correctly. A voltage divider network is connected via resistors R1, R2 (22, 24) to an analog to digital (ND) channel of a microcontroller 28 forming part of the microcontroller circuitry of the device 10, to feed a battery state signal MEAS2 (26) to the microcontroller 28, thereby to allow the microcontroller 28 to monitor the state of the battery 12.

Microcontroller and Associated Circuitry

The microcontroller 28 constitutes the central control unit for the device circuitry. It provides the logic and control signals for all aspects of operation of the repellant device 10.

After a reset, whether it is by battery replacement or by a forced reset by any means, the microcontroller 28 is programmed to set all the control signals to an initial reset state, determine whether there has been any prior operation before reset and synchronize operations accordingly.

A standard reset/brownout protection device 30 is included in the microcontroller circuitry which can be used to force the microcontroller 28 into a reset state should the battery voltage drop below a predetermined operational threshold or if the battery is removed and another (recharged or new) battery 12 is connected in circuit.

Capacitor Charge Circuitry

In the embodiments illustrated in the drawings, the charge storage devices are constituted by capacitors.

Referring first to FIG. 6, the capacitor charging circuitry 32 includes four capacitors C2, C3, C4 and C5 (34, 36, 38, 40).

After initial reset, the microcontroller 28 is programmed to continually charge the capacitors C2, C3, C4 and C5 (34, 36, 38, 40) to their working voltage, which is in the region of 25V to 90V.

The capacitors C2, C3, C4, C5 (34, 36, 38, 40) are charged up by the microcontroller 28 switching ON transistor Q1 (42) which, in turn, switches field effect transistor FET-3 (44) ON by pulling its gate to 0V. The microcontroller 28 drives the FET low side driver circuit 46 which, in turns drives the gate of FET-4 (48), which is turned OFF and ON with a pre-programmed periodicity to charge the capacitors C2, C3, C4, C5 (34, 36, 38, 40) by means of the inductor L1 (50). This arrangement of FET-4 (4) and inductor L1 (50) forms the basis of a boost regulator circuit.

A fast diode D2 (52) regulates the direction of charge into the capacitors C2, C3, C4, C5 (34, 36, 38, 40).

The signal MEAS1 (58) formed by the resistors R4 and R6 (54, 56), is applied to another of the ND channels of the microcontroller 28.

The microcontroller 28 terminates the process of charging the capacitors C2, C3, C4, C5 (34, 36, 38, 40) and turns FET-3 (44) OFF when the signal MEAS1 (58) reaches the required threshold, indicating that the capacitors C2, C3, C4, C5 (34, 36, 38, 40) are fully charged. This threshold value is programmed into the microcontroller 28.

With the capacitors C2, C3, C4, C5 (34, 36, 38, 40) charged and the battery 12 connected, the capacitor charge circuitry 32 maintains a minimal charge of about 6V across the electrode connectors 68 (to which the device electrodes—not shown in FIG. 6—are connected) by keeping N-channel FET-1 (60) ON.

With the device 10 not immersed in water, the device maintains an "out-of-water" state in which the charge across the electrode connectors 68 gives rise to a measurable current drain that, in turn, gives rise to a measurable, relatively constant decay of the signal MEAS1 (58). This rate of decay is programmed into the microcontroller 28 which measures the signal MEAS1 (58) continuously. If the device 10 is immersed or placed in water, the current drain across the electrodes value of the signal MEAS1 drops substantially and much faster than the pre-programmed rate.

The microcontroller 28 is programmed to interpret this signal strength reduction as an indication that the device 10 has been immersed in water and, in response, switches the device 10 to an "in-water state" in which the device begins to operate normally.

When the converse of the above occurs, that is when the signal decay at MEAS1 (58) reduces to normal (within the pre-programmed band), the microcontroller 28 switches the device 10 back to an "out-of-water state". In the out-of-water state, the device power requirement is minimal in order to maximise battery life.

Electrode Discharge FET Driver

In the in-water state of the device and with the capacitors C2, C3, C4, C5 (34, 36, 38, 40) charged to the required voltage, the microcontroller 28 discharges capacitor C2 (34) by firing the FET high side driver 62 connected to N-channel FET-1 (60).

With the water in which the device 10 is immersed completing the circuit, a pulse of electrical current is discharged between the electrodes connected to the electrode connectors 68, thereby to establish an electrical energy field in the body of water in which the device 10 is immersed for the duration of the pulse.

This is a first pulse and between 1 ms (one millisecond) and 100 ms (one hundred milliseconds) after the firing of the first pulse, the microcontroller 28 discharges the capacitors C3, C4 and C5 (36, 38, 40) simultaneously by firing FET high side driver 64 connected to N-channel FET-2 (66) to discharge a second pulse of electrical current between the electrodes. This secondary pulse contains more energy than the first pulse, being the combined discharge energy of capacitors C3, C4 and C5 (36, 38, and 40).

The microcontroller 28 is programmed to switch the device circuitry to recharge and discharge the capacitors C2, C3, C4, C5 (34, 36, 38, 40) repetitively at a predetermined repetition frequency, thereby to create repeating trains of pulses of electrical current flow in the body of water between the electrodes, the pulse trains having a repetition frequency equal to the charge and discharge repetition frequency predetermined by the microcontroller 28.

The microcontroller 28 controls the device circuitry to continually charge the capacitors C2, C3, C4 and C5 (34, 36, 38, 40) to their working voltage after every discharge and, with the device 10 in the in-water state, the cycle of charging and discharging of the capacitors C2, C3, C4, C5 (34, 36, 38, 40) simply repeats itself. As a result, the device 10 repeatedly discharges a train of pulses of electrical current through the electrodes to establish a pulsed electrical energy field in the water in which the device is immersed.

In the device 10 described immediately above, the pulse train is a two-pulse train, but depending on power availability, the number of pulses per pulse train can be increased.

This is illustrated in the pulse emission waveform diagrams of FIGS. 3 and 5.

FIG. 3 illustrates the normal mode two-pulse train referred to above and shows a series of pulse trains 70, made up of individual pulses 72 of electrical energy discharged between the electrodes of the device 10. The pulse amplitude is determined by the capacity of the capacitors C2, C3, C4, C5 (34, 36, 38, 40) and the pulses 72 are separated from one another by a pulse interval 74 determined by the microcontroller 28 programming which sets the firing time between firing of the capacitor C2 (34) and the capacitors C3, C4, C5 (36, 38, 40). The pulse trains 70 are separated from one another by an interval, which interval is repetitive and determined by the microcontroller 28 programming, thereby to determine the pulse train repetition frequency 76.

The pulse train repetition frequency 76 is possibly not critical, as long as it is within the muscular stimulus discomfort range of the target animal.

It is suggested however, that the delay between pulses 72 in a pulse train 70 (the pulse interval 74) should be timed to maximise the muscle stimulation potential of the proposed pulse train.

In this regard it is understood that, like all animals, the myo-neural physiology of elasmobranchs and sharks in particular, which is not fully researched as yet, operates on the basis that an increased pulse repetition rate (rather than an increase in the pulse amplitude) is used to transmit intensity of nervous system stimulation.

This is the reason for the use of pulse trains 70 rather than single pulses.

It is further understood that current thinking in respect of myo-neural physiology and nerve cell electrochemistry is to the effect that electrical nerve stimulation only commences when a certain threshold or nerve cell action potential is reached, at which point a membrane channel or gate opens briefly to allow sodium ions into the neuron. As this sodium gate closes, a similar membrane channel or potassium gate opens, releasing positively charged potassium ions and returning the cell to a negative charge. Since the potassium gate closes slowly, the cell becomes more negative than it was before the action potential, which keeps it from firing again for a brief period which is referred to as the refractory period.

With this in mind, it is suggested that the first pulse 72 of each pulse train 70 of the device 10 need not be a high energy pulse. It should simply have enough energy to stimulate the nervous system of the target animal to start the opening the nerve cell sodium gates. The first pulse 72 must be followed rapidly by a second, higher energy pulse 72, preferably within the period in which the sodium gate is open. On the understanding that the nerve cell sodium gate "open time" is around 1 ms, it is suggested that the interval 72 between pulses in a pulse train should be about 1 ms.

It is thought, however, that a pulse interval greater than 1 ms and anything up to about 100 ms, will not lead to any significant decrease in the stimulus potential of the second pulse 72.

Having regard to the refractory period of nerve cells referred to above, it is suggested that the pulse repetition frequency 76 must be greater than the refractory period, since no or substantially less nervous system stimulation will be possible within the refractory period.

The device 10 of the invention can be scaled up to increase the number of pulses 72 in each pulse train 70 by simply increasing the number of capacitors beyond the capacitors C2, C3, C4, C5 (34, 36, 38, 40) illustrated. By incorporating additional capacitors or banks of capacitors, the device 10 can be adapted, for instance, to emit a five pulse pulse train 70.1 such as that illustrated in FIG. 5.

It will be appreciated that such a scaled up device will require substantially more electrical energy than the device described above, but on larger watercraft and in fixed installations, the supply of electrical energy need not be a limiting factor.

Accelerometer and Warning Buzzer

The device 10 is fitted with accelerometer and warning buzzer circuitry 78 which includes a warning buzzer 80 that is intended to provide an audible warning to indicate to the user that battery replacement or recharge is necessary.

An accelerometer 82 is included to provide the microcontroller 28 with a form of motion sensing and is set to signal the microcontroller 28 in the event that the device 10 is subjected to motion above a pre-programmed threshold, which would normally be indicative of the watercraft surfing a wave. In such a situation, shark attack is unlikely and the microcontroller 28 can be programmed to slow down the repetitive firing rate of the device 10 to conserve battery power.

This is illustrated in FIG. 4 where the device is, at first, shown in an "active mode" with the electrodes emitting pulse trains 70 at the preprogrammed frequency 76.

On receipt of the accelerometer signal, the microcontroller 28 switches the device 10 to a "passive mode" in which the microcontroller 28 switches the capacitors C2, C3, C4, C5 (34, 36, 38, 40) to emit single pilot pulses 84. The pilot pulses 84 can be emitted at a reduced pulse repetition frequency 70.

As soon as the craft is at rest, indicating the user paddling or at rest in the water, the accelerometer signal to the microcontroller 28 will indicate that the device is subjected to motion below the pre-programmed threshold, in which event the microcontroller 28 will switch the device 10 back into active mode, thereby switching the microcontroller 28 to emit the preprogrammed pulse trains 70 at the preprogrammed frequency 76.

Alternative Device

Figure 7:
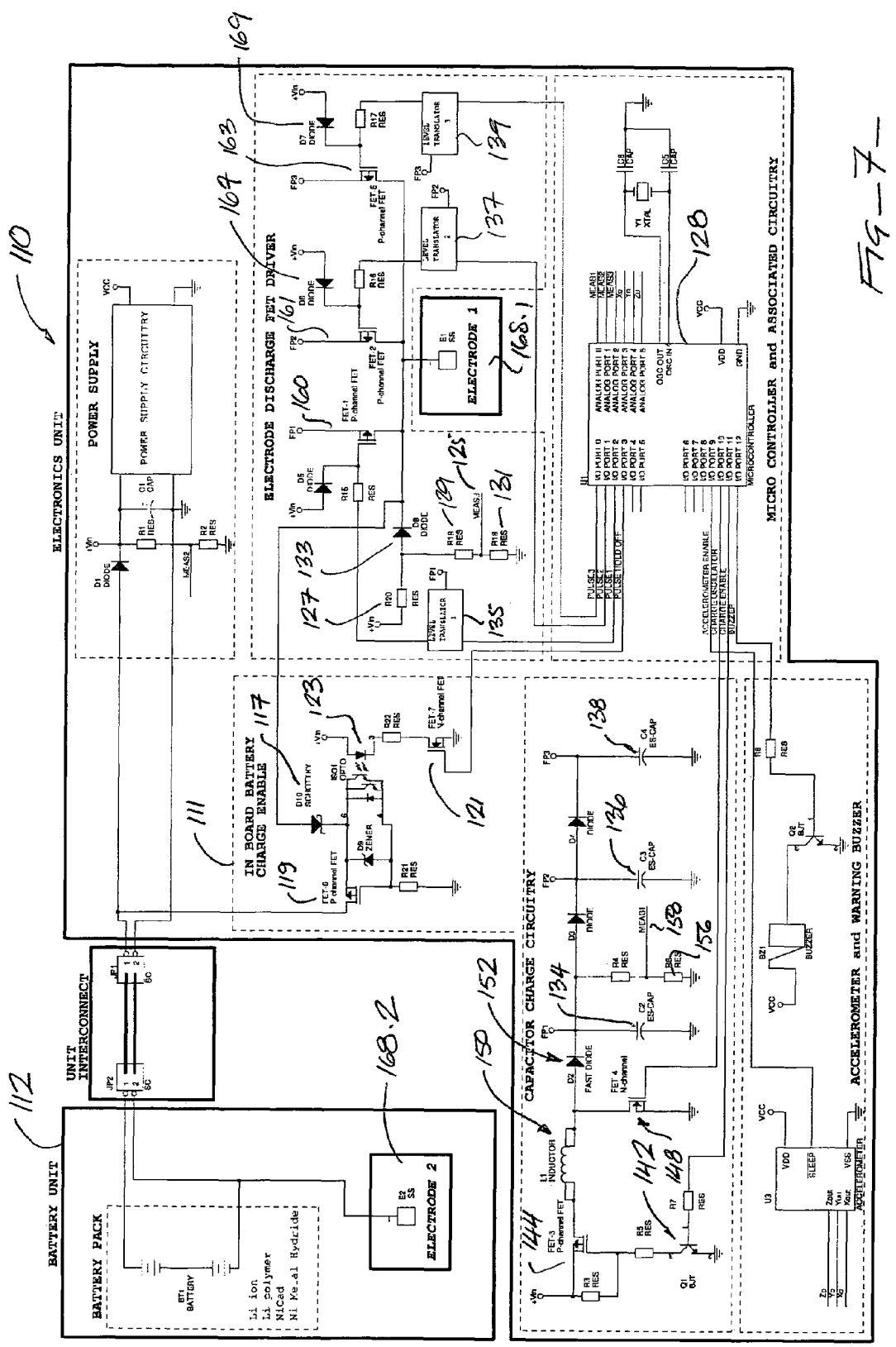
FIG. 7 is a schematic circuit diagram of a second embodiment of the shark repellant device of the invention

The device 110 illustrated and described with reference to FIG. 7 is very similar to the device 10 illustrated and described with reference to FIGS. 1 to 6 and similar elements will not be described. Only the differences between the two circuits will be described in any detail.

In the device 10 of FIG. 6 the device circuitry and the battery are connected by at least 3 wires, which could create problems during insertion and removal of the battery and device circuitry. It also requires more complex (and therefore costly) manufacturing and assembly processes.

This problem is rectified in the circuitry illustrated in FIG. 7 by means of the additional circuitry 111 labelled "IN BOARD BATTERY CHARGE ENABLE".

The most important function of the IN BOARD BATTERY CHARGE ENABLE circuitry 111 however, is that it permits in situ or on-board charging of the battery 112 thereby obviating the need for removal of the battery 112 during bad weather or on sandy beaches, which provides opportunity for the ingress of sand or water and possible incorrect fitting of the battery 112.

To permit on-board charging of the battery 112, the electrode plates 108, 109 on the surfboard 100 are formed with charging sockets 113, 115 that are unequally shaped or sized to prevent accidental incorrect charger connection. The charger (not shown) is fitted with two fly leads with bananatype plugs on the end of each of the leads. The banana plugs are unequally shaped or sized, complementally to the charging sockets 113, 115 to prevent accidental incorrect charger connection. To achieve this object, the fly leads and charging sockets 113, 115 are simply provided with different diameters, so that the negative lead cannot be inserted in the positive electrode and vice versa.

The IN BOARD BATTERY CHARGE ENABLE circuit 111 is implemented such that a charger connected to the electrodes 108, 109 is given direct access to the battery 112 if the battery is flat, by supplying an electrical path directly to the battery. A diode D10 (117) provides a forward bias condition for the charging path directly from the electrode. FET-6 (119), by virtue of a biasing resistor, will be ON if the battery 112 is flat and act as a switch, thereby providing a direct electrical path to facilitate charging of the battery 112.

When the device 110 is turned ON (when it is immersed in water) it is necessary to switch FET-6 (119) OFF so that energy pulses discharged at the electrodes 168 are not applied to and damage the battery 112. This is achieved by FET-7 (121) and an optical isolator or optocoupler 123. With the device 110 operating under normal conditions, the microcontroller 128 turns FET-7 (121) ON which turns the optocoupler 123ON so that it acts as a switch that shorts the gate of FET-6 (119) to its drain, which ensures it is turned OFF, providing a high impedance path to prevent energy pulses from reaching the battery 112.

As in the device 10, the microcontroller 128 constitutes the central control unit for the device circuitry. It provides the logic and control signals for all aspects of operation of the device 110.

The capacitor charge circuitry 132 includes three capacitors C2, C3, C4 (134, 136, 138). After initial reset, the microcontroller 128 is programmed to continually charge the capacitors C2, C3, C4 (134, 136, 138) to their working voltage, which is in the region of 15V to 90V.

The capacitors C2, C3, C4 (134, 136, 138) are charged up by the microcontroller 128 switching ON transistor Q1 (142) which, in turn, switches field effect transistor FET-3 (144) ON by pulling its gate to 0V. The microcontroller 128 drives the gate of FET-4 (148), which is turned OFF and ON with a pre-programmed periodicity to charge the capacitors C2, C3, C4 (134, 136, 138) by means of the inductor L1 (150). This arrangement of FET-4 (4) and inductor L1 (150) forms the basis of a boost regulator circuit.

A fast diode D2 (152) regulates the direction of charge into the capacitors C2, C3, C4 (134, 136, 138).

The signal MEAS1 (158) formed by the resistors R4 and R6 (154, 156), is applied to another of the A/D channels of the microcontroller 128.

The microcontroller 128 terminates the process of charging the capacitors C2, C3, C4 (134, 136, 138) and turns FET-3 (144) OFF when the signal MEAS1 (158) reaches the required threshold, indicating that the capacitors C2, C3, C4 (134, 136, 138) are fully charged. This threshold value is programmed into the microcontroller 128.

In the device 10, the unit charges the discharge capacitors to about 6 Volts and monitors this voltage by turning on one of the discharge FETs. If this voltage sinks very quickly to 0 Volts, it is assumed that the device 10 has been immersed in water and the normal operation of the device 10 is resumed. In the device 110, this operation is replaced with a small bleeding circuit to achieve the same outcome instead of maintaining charge in the capacitors and switching the circuit continually into operational mode, which is a waste of energy if the device 110 is being transported.

To achieve this in the device 110, the accelerometer 182 is used to trigger sampling of a signal MEAS3 (125), which will drop to a value very close to 0 Volts if the device 110 is immersed or submersed in water and which, otherwise (out of the water), will have a measurable value above a threshold. This signal is used to determine if the device 110 is in or out of the water. The MEAS3 signal 125 is formed by feeding the battery voltage through a high value resistor 127 and to a voltage divider network formed by resistors 129, 131. This signal is then fed through diode D8 (133) to the electrode 168.1. Diode D8 (133) provides protection to this circuitry when the device 110 is functioning normally and emitting pulses.

The microcontroller 128 is programmed to interpret the MEAS3 (125) signal strength reduction as an indication that the device 110 has been immersed in water and, in response, switches the device 110 to an "in-water state" in which the device 110 begins to operate normally.

When the converse of the above occurs, that is when the signal decay at MEAS3 (125) is reduces to normal (within the pre-programmed band), the microcontroller 128 switches the device 110 back to an "out-of-water state".

The device 10 of FIG. 6 fires a maximum of 2 pulses. In the device 110 of FIG. 7, an additional firing stage is included which allows the device 110 to fire from one up to three pulses and any combination thereof.

This is achieved by the inclusion of an additional discharge driver.

In FIG. 7 the blocks marked "LEVEL TRANSLATOR" (135, 137, 139) can be any type of switching element capable of ensuring that the P-channel FETs (FET-1 (160), FET-2 (161) and FET-5 (163)) are OFF when a specific logic level is fed to them and ON when this logic level is reversed. The LEVEL TRANSLATORS (135, 137, 139) can be transistors, FETs or the like, provided they are capable of providing a bleed current to ensure that the FETs (FET-1 (160), FET-2 (161) and FET-5 (163)) are switched hard OFF and hard ON under control of the microcontroller 128.

If a capacitor is allowed to discharge completely and then recharged, the inrush current (the instantaneous input current drawn by the capacitor when charged up from complete discharge) is substantially greater than the normal capacitor charging current drain. If the capacitor is not discharged below battery voltage, the reduction in the inrush current drain has been found to reduce the battery recharge requirements significantly so that a lot more useful work can be obtained on a single battery charge.

In the device 10 of FIG. 6, the microcontroller 28 is used to read the A/D converter during the discharge cycle to determine when to turn OFF the discharge FET in order to reduce the amount of inrush current into the discharge capacitor.

To avoid the unnecessary battery drain caused by inrush current, the device 110 has a bias diode fed into each of the gates of the discharge FETs (FET-1 (160), FET-2 (161) and FET-5 (163)). The diodes D5, D6, D7 (165, 167, 169) provide a turn-off voltage to turn OFF each of the FETs (FET-1 (160), FET-2 (161) and FET-5 (163)) off when its source voltage is close to battery voltage, thereby leaving a charge in the capacitor equal to the battery voltage, thereby greatly enhancing battery charge utilisation.

When the device 110 is immersed in water, the water completes the circuit and pulses of electrical current are discharged between the electrodes 168 to establish an electrical to energy field in the body of water in which the device 110 is immersed, in a manner similar to that described above.

The invention claimed is:

1. A device for controlling aquatic animals in a body of water, comprising:
   at least one first and one second electrode, connected in a circuit, for immersion in a body of water, such that the water, in use, completes the circuit;
   two or more discretely connected electrical charge storage devices;
   a charging circuit for charging the charge storage devices from a source of electrical energy;
   control means for generating control signals; and
   a controllable switch element for each charge storage device acting under the control of the control means; the control means being configured to switch each switch element sequentially to connect the charge storage devices to the electrodes in response to the control signals, to discharge the charge storage devices sequentially; and further configured to create, with each such discharge, a pulse of electrical current flow in the body of water between the electrodes.

2. The device for controlling aquatic animals according to claim 1, wherein each charge storage device discharges one electrical pulse and the number of pulses are determined by the number of charge storage devices.

3. The device of claim 1, wherein the control means compromising a programmable microcontroller programmed to switch the device circuitry to recharge and discharge the charge storage devices repetitively at a predetermined repetition frequency, wherein to create repeating pulses of electrical current flow in the body of water between the electrodes, the pulses having a repetition frequency equal to the charge and discharge repetition frequency predetermined by the microcontroller.

4. The device of claim 3, wherein the microcontroller is programmed to switch the device circuitry to recharge and discharge at least some of the charge storage devices in groups with predetermined intervals between each discharge, each group so discharged creating a train of pulses of electrical current flow in the body of water between the electrodes, to create repeating pulse trains of electrical current flow in the body of water, the pulse trains having a repetition frequency equal to the charge and discharge repetition frequency predetermined by the microcontroller.

5. The device of claim 4, wherein each charge storage device discharges one electrical pulse and the number of pulses in a pulse train are determined by the number of charge storage devices in the group of charge storage devices discharged as a group.

6. The device of claim 3, wherein a pulse amplitude is determined by the charge storage capacity of the charge storage devices, the pulses are separated from one another in pulse trains by a pulse interval determined by the microcontroller programming and the pulse trains are separated from one another by an interval, which interval is repetitive and determined by the microcontroller programming, thereby to determine the pulse train repetition frequency.

7. The device of claim 6, wherein the pulse train repetition frequency is between 500 ms (five hundred milliseconds) and 3 Hz (three Hertz).

8. The device of claim 3, wherein said device is configured to maintain an "out-of-water" state in which, with the charge storage devices charged and the power source connected, the charge storage device charge circuitry maintains a minimal charge across the electrodes, the charge across the electrodes being adapted to create a measurable current drain that gives rise to a measurable, relatively constant decay of a measurable signal, the rate of decay being programmed into the microcontroller which is programmed to measure the signal at predetermined intervals, the device being adapted, if the device is placed in water in use, for the current drain across the electrodes to increase and the value of the measured signal to drop at a rate greater than the pre-programmed rate, the microcontroller being programmed to interpret this signal strength reduction as an indication that the device has been immersed in water and to switch the device to an "in-water state" in which the device begins to operate normally and, when the measured signal decay reduces to within the pre-programmed band, to switch the device back to an "out-of-water state".

9. The device of claim 3, wherein an accelerometer adapted to signal the microcontroller in the event that the device, in use, is subjected to motion above a pre-programmed threshold, the microcontroller being programmed to reduce the repetitive discharge of the charge storage devices to conserve power.

10. The device of claim 9, wherein said device is configured to maintain an "in-water state" in which the device operates normally and an "out-of-water" state in which, with the charge storage devices charged and the power source connected, the device charge circuitry maintains no charge across the electrodes, the accelerometer being adapted to trigger sampling of a signal with a measurable value above a threshold, formed by feeding the battery voltage through protective circuitry to at least one of the electrodes, the circuitry being adapted to reduce the signal voltage measurably when, in use, the device is immersed in water, the microcontroller being programmed to interpret the signal strength reduction as an indication that the device has been immersed in water and to switch the device to the in-water state and to switch the device back to the out-of-water state when the signal decay reduces to within a pre-programmed band.

11. The device for controlling aquatic animals according to claim 1, further comprising:
  a first set of charge storage devices comprising at least one charge storage devices that, together, have a predetermined charge storage capacity;
  a second set of charge storage devices comprising a plurality of charge storage devices, each having the same charge storage capacity as the total charge storage capacity of the first set of charge storage devices;
  a controllable switch element for the first charge storage device set;
  a controllable switch element for the second charge storage device set;
  the control means being configured to switch the switch element associated with the first charge storage device set to connect the charge storage devices in the first set to the electrodes and, after a predetermined delay, to switch the switch element associated with the second charge storage device set to connect all the charge storage devices in the second set simultaneously to the electrodes, first to discharge the charge storage devices in the first set and, after the predetermined delay, to discharge the charge storage devices in the second set; said control means being further configured to create, with the first discharge, a pulse of electrical current flow between the electrodes in the body of water; and to create, with the second discharge, a higher energy pulse of electrical current flow between the electrodes in the body of water.

12. The device of claim 11, wherein the control means is adapted to switch the switch element associated with the second charge storage device set to connect all the charge storage devices in the second set sequentially to the electrodes, to discharge the charge storage devices in the second set sequentially.

13. The device of claim 1, wherein the body of water in which the device is immersed completing the circuit, a first pulse of electrical current is discharged between the electrodes and, between 1 ms (one millisecond) and 100 ms (one hundred milliseconds) after the discharge of the first pulse, at least one second pulse of electrical current is discharged between the electrodes.

14. The device of claim 13, wherein the interval between pulses in each pulse train is between 1 ms (one millisecond) and 100 ms (one hundred milliseconds).

15. The device of claim 1, wherein the charge storage devices comprising a plurality of capacitors.

16. The device of claim 1, wherein the controllable switch elements for each charge storage device are constituted by Field Effect Transistors (FETs), the device circuitry being adapted to reduce power source drain caused by inrush current, the device including means to turn OFF each FET prior to full discharge of the charge storage device switched by that FET.

17. The device of claim 1, wherein said device is configured for installation on a personal watercraft, comprising a surfboard, a surf ski, or paddle ski, said device further comprising:
- a pair of housings adapted for permanent installation in or on the watercraft;
- the housings being connected to one another by a cable tray adapted for permanent installation in or on the watercraft;
- the cable tray being adapted to house a wiring harness and electrical connectors;
- one of the housings being adapted for housing a removable module containing the device circuitry;
- the other housing being adapted to house a removable module containing the rechargeable power source; and
- each housing comprising a cover plate that is adapted to serve as an electrode plate.

18. The device of claim 17, further comprising dummy modules adapted to substitute for the circuitry and power source modules when protection is not required.

19. The device of claim 17, wherein the cable tray and wiring harness are dimensioned to permit the electrode plates an electrode spacing sufficient to provide an efficient discharge of electrical energy into the water in use.

20. A method of controlling aquatic animals in a body of water comprising:
- connecting at least one first and one second electrode in a circuit adapted for immersion in a body of water, such that the water, in use, completes the circuit;
- the circuit including two or more discretely connected electrical charge storage devices, a charging circuit for charging the charge storage devices from a source of electrical energy, control means for generating control signals and a controllable switch element for each charge storage device acting under the control of the control means; and
- programming the control means to switch each switch element sequentially to connect the charge storage devices to the electrodes in response to the control signals, to discharge the charge storage devices sequentially and to create, with each such discharge, a pulse of electrical current flow in the body of water between the electrodes.

* * * * *